(No Model.)

L. MENGELER.
STOCK CAR.

No. 357,219. Patented Feb. 8, 1887.

Witnesses:
J. B. Halpenny.
M. M. Gridley.

Inventor:
Louis Mengeler,
By Gridley & Fletcher
his Attys.

UNITED STATES PATENT OFFICE.

LOUIS MENGELER, OF ELGIN, ILLINOIS.

STOCK-CAR.

SPECIFICATION forming part of Letters Patent No. 357,219, dated February 8, 1887.

Application filed May 27, 1886. Serial No. 203,371. (No model.)

*To all whom it may concern:*

Be it known that I, LOUIS MENGELER, of Elgin, in the county of Kane and State of Illinois, have invented certain new and useful Improvements in Stock-Cars, of which the following is a description, reference being had to the accompanying drawings, in which—

Figure 1:
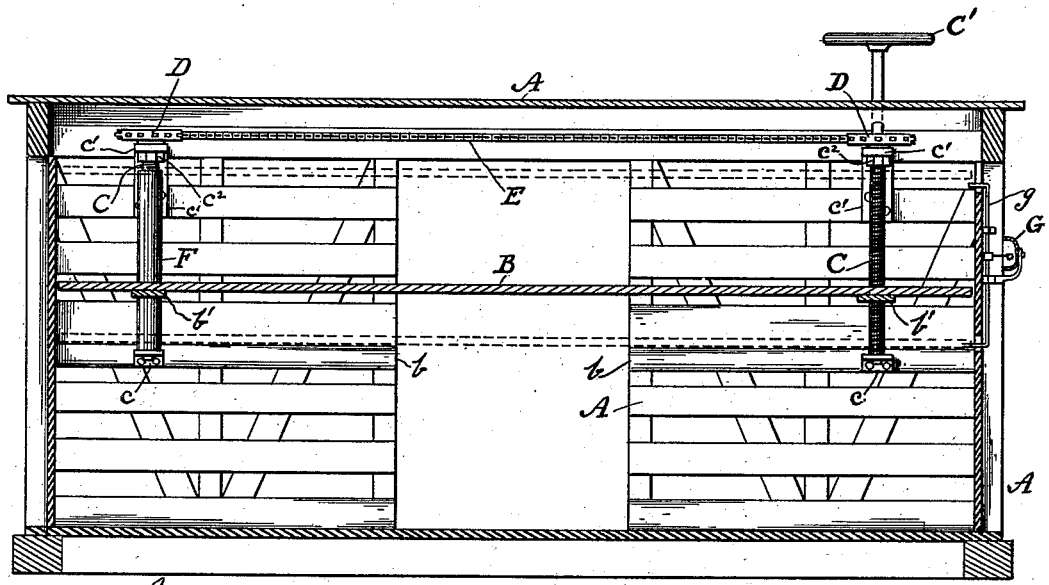
Figure 2:
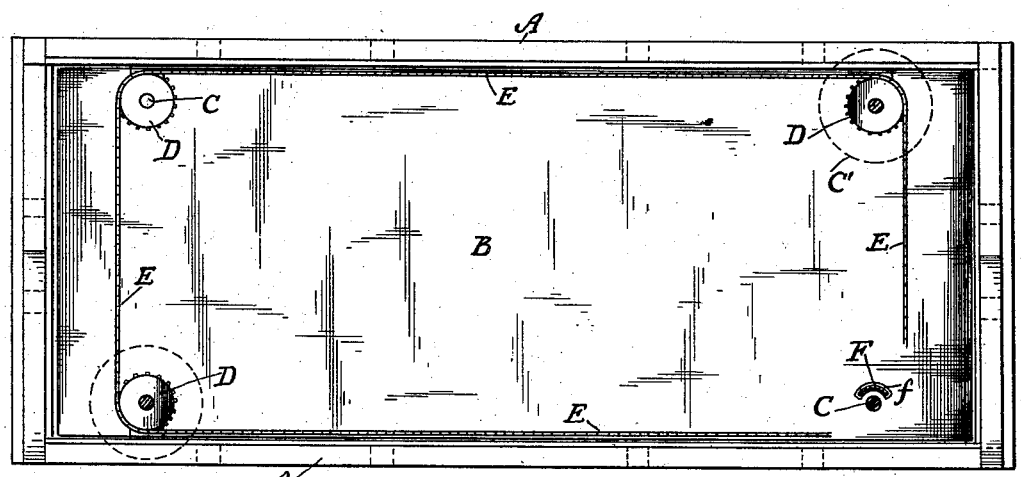
Figure 3:
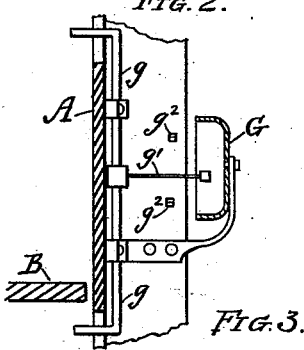

Figure 1 is a vertical longitudinal sectional view. Fig. 2 is a plan view of said car with the cover and one of the sprocket-wheels removed to show the interior mechanism; and Fig. 3 is an enlarged vertical sectional view, in detail, of an alarm-bell and operating mechanism.

Like letters of reference indicate like parts in the different figures.

The object of my invention is to provide a simple and cheap stock-car, so constructed that the same may be utilized as a double-deck car in shipping hogs, sheep, and the like, or as an ordinary stock-car for shipping cattle and horses, all of which is hereinafter more particularly described, and definitely pointed out in the claims.

In the drawings, A represents the body or frame of an ordinary stock-car, within which I place a secondary movable floor or deck, B, adapted to be raised to the top of the car when not in use, and lowered, in the manner hereinafter stated, to a point at or about the middle of said car-body when employed for shipping. When so lowered, I provide strips or cleats $b\ b$, attached rigidly to the inside of the car and projecting inwardly therefrom for the floor B to rest upon, said floor occupying the position shown in dotted lines in said figure. Upon the inside of the car and attached rigidly to the body I provide brackets or bearings $c\ c'$, preferably two upon each side, near the respective ends of the car, which serve as bearing-supports for the screw-threaded shafts C, one or more of which, but preferably two, are made to project upwardly through the roof of the car, as shown in Fig. 1, and are provided with a hand-wheel, C', for operating the same. Nuts or washers $c^2 c^2$ are provided to hold said shafts in position. Across and beneath the floor B, I place re-enforcing bars or supports $b'\ b'$, Fig. 1, in line with said screws C, through which and said floor the shafts C are projected. Said bars $b'$ may be made of metal, having screw-threads cut therein for the reception of those upon the shafts C, or suitable nuts or bushing-plates may be set therein, having threads to receive those of the shafts. Immediately beneath the roof of the car, substantially as shown, I place sprocket-wheels D upon each of said shafts and attached rigidly thereto, which wheels I connect with an endless drive or sprocket chain, E.

To prevent stock from being injured by rubbing against the shafts C when the floor is raised, I provide shields F, of sheet iron or other metal, one of which is shown in Fig. 1 and one in Fig. 2. Said shields are preferably semicircular in shape and are attached rigidly at the top and bottom, respectively, to the brackets $c\ c'$, suitable holes, $f$, Fig. 2, being formed in the floor B to receive said shields.

Upon turning the hand-wheels C' it is obvious that the floor B may be raised or lowered at will and the car used as an ordinary or as a double-decked car.

In order that the operator upon the top of the car may know when the movable floor has reached the full limit of its movement either up or down, I prefer to employ an alarm to indicate its movement or position. Any suitable device may serve this purpose, and I have shown one in the drawings which may be modified as desired. G, Figs. 1 and 2, represents an alarm-bell rigidly attached to the car-frame. A sliding rod, $g$, having its ends projecting inwardly, so as to engage with the end of the floor B, is supported in bearings, so that it may be permitted to slide vertically. As the floor reaches the limit of its movement up or down, it moves the rod, causing the spring-hammer $g'$ to pass over a projecting knob, $g^2$, which causes the spring to bend, and the hammer, in its reaction, strikes the bell. It is obvious that said movable floor may be applied to any ordinary stock-car, and that the expense of the same is but little more than that of a permanent floor, which, as is well known, prevents the car from being used for other purposes.

While I prefer them, I do not confine myself to the use of the sprocket wheels and chain, as it is apparent that bevel-gears and shafting may be used instead.

Having thus described my invention, what I claim, and desire to secure by Letters Patent, is—

1. The combination, with a stock-car, of the floor B, screws C, and means, as the sprocket-wheels D and chain E, for operating the same in unison, substantially as set forth.

2. The combination, with a stock-car, of the floor B, screws C, means, as the sprocket-wheels D and chain E, for operating the same in unison, and stationary shields for covering said screws when the floor is raised, substantially as specified.

3. The combination of a stock-car, a movable floor, a series of screws for raising and lowering the latter, and an alarm for indicating the respective limits of its movement, substantially as described.

LOUIS MENGELER.

Witnesses:
 HENRY BLESSE,
 HENRY C. RUNGE.